United States Patent [19]

Konoma

[11] 4,277,149

[45] Jul. 7, 1981

[54] MODIFIED GAUSS TYPE LENS SYSTEM

[75] Inventor: Kunihiko Konoma, Sakai, Japan

[73] Assignee: Minolta Camera Kabushiki Kaisha, Osaka, Japan

[21] Appl. No.: 939,381

[22] Filed: Sep. 5, 1978

[30] Foreign Application Priority Data

Sep. 7, 1977 [JP] Japan .................. 52/108249

[51] Int. Cl.³ .............................. G02B 9/60
[52] U.S. Cl. .................................. 350/467
[58] Field of Search ........................ 350/218

[56] References Cited

U.S. PATENT DOCUMENTS

| 2,627,204 | 2/1953 | Tronnier . | |
| 2,683,396 | 7/1954 | Klemt et al. . | |
| 2,735,340 | 2/1956 | Aklin . | |
| 3,817,603 | 6/1974 | Takahashi | 350/218 |
| 4,131,335 | 12/1978 | Kimura | 350/218 |
| 4,139,265 | 2/1979 | Matsui | 350/218 |

FOREIGN PATENT DOCUMENTS

| 1064250 | 2/1960 | Fed. Rep. of Germany . |
| 2701424 | 7/1977 | Fed. Rep. of Germany . |
| 29-1225 | 3/1954 | Japan . |
| 38-11587 | 7/1963 | Japan . |
| 50-134637 | 10/1975 | Japan . |
| 53-17054 | 6/1978 | Japan . |

OTHER PUBLICATIONS

Abstract of German DBP No. 1,118,491 Jun., 1960.

*Primary Examiner*—John K. Corbin
*Assistant Examiner*—Scott J. Sugarman
*Attorney, Agent, or Firm*—Jackson, Jones & Price

[57] ABSTRACT

A modified Gauss type lens system of 5-group, 6-element is disclosed, which lens system comprises first to third and fifth groups each consisting of a single lens element and a fourth group consisting of a doublet and fulfills the following conditions:

$2.8f < f_{1,2,3} < 10f$
$0.25 < (d_1+d_2+d_3+d_4+d_5)/\Sigma d < 0.35$
$(N_1+N_2+N_5+N_6)/4 > 1.72$
$1.0 < r_6/|r_7| < 1.5$
$0.2f < |r_7| < 0.35f$
$N_1, N_2 > 1.71$
$30 < \nu_1, \nu_2, \nu_5, \nu_6 < 56$
$28 < \nu_3, \nu_4 < 40$

21 Claims, 24 Drawing Figures

Spherical Aberration
Sine Condition

Astigmatism

Distortion

Coma(Meridional)

Coma(Sagittal)

Spherical Aberration
Sine Condition

Astigmatism

Distortion

Spherical Aberration
Sine Condition

Astigmatism

Distortion

Spherical Aberration
Sine Condition

Astigmatism

Distortion

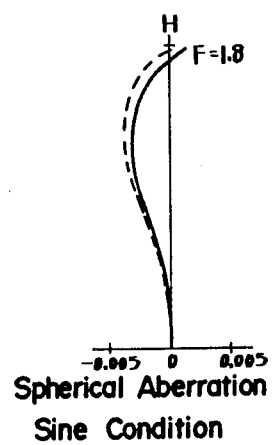
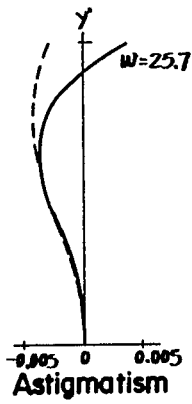
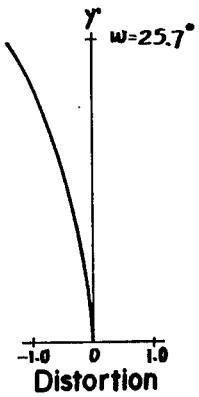
FIG.7a — Spherical Aberration / Sine Condition
FIG.7b — Astigmatism
FIG.7c — Distortion
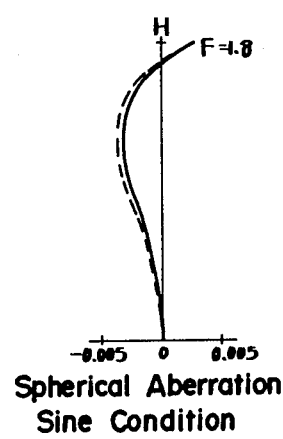
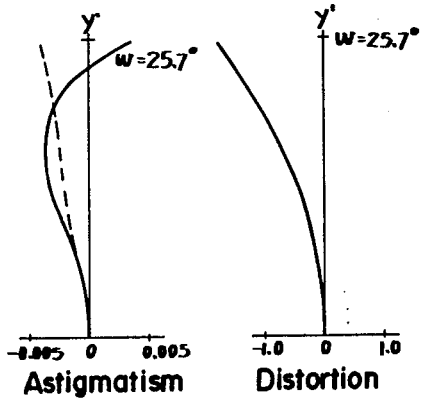
FIG.8a — Spherical Aberration / Sine Condition
FIG.8b — Astigmatism
FIG.8c — Distortion
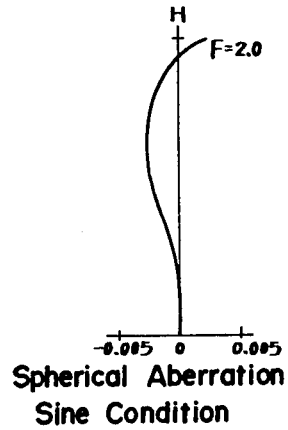
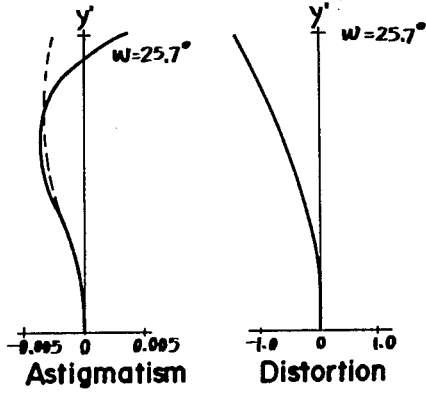
FIG.9a — Spherical Aberration / Sine Condition
FIG.9b — Astigmatism
FIG.9c — Distortion

MODIFIED GAUSS TYPE LENS SYSTEM

BACKGROUND OF THE INVENTION

1. Field of the Invention

The present invention relates generally to a Gauss type lens system and more particularly to a modified Gauss type lens system in which the doublet in the second lens group of the typical 4-group, 6-element Gauss type lens system is separated into two single lens elements to form a 5-group, 6-element lens system.

2. Description of the Prior Art

As is known in the prior art, an exchangeable objective lens for use in a single lens reflex camera requires a sufficient back focal distance to allow the movement of the swingable reflex mirror in the camera body. A Gauss type or modified Gauss type lens system, however, is generally difficult to be designed to have a relatively great back focal distance with various aberrations well corrected. In fact, the back focal distances of conventional Gauss type or modified Gauss type lens systems are only about 70 percent of the focal length of the system, if they are designed to be of aperture ratio, about F/2.0 or still higher aperture ratio.

SUMMARY OF THE INVENTION

An object of the present invention is to provide a modified Gauss type lens system having a back focal distance greater than 75 percent of the focal length of the whole lens system and a field angle greater than about 50 degrees.

Another object of the present invention is to provide a high speed 5-group, 6-element lens system in which an aperture ratio of F/1.8 is capable if desired.

Still another object of the present invention is to provide a modified Gauss type lens system with various aberrations well corrected.

Further object of the present invention is to provide a modified Gauss type lens system of a compact size.

According to the present invention, the modified Gauss type lens system of 5-group, 6-element construction, which comprises first to third and fifth groups each consisting of a single lens element and a fourth group consisting of a doublet, fulfills the following conditions:

$2.8f < f_{1,2,3} < 10f$
$0.25 < (d_1 + d_2 + d_3 + d_4 + d_5)/\Sigma d < 0.35$
$(N_1 + N_2 + N_5 + N_6)/4 > 1.72$
$1.0 < r_6/|r_7| < 1.5$
$0.2f < |r_7| < 0.35f$
$N_1, N_2 > 1.71$
$30 < \nu_1, \nu_2, \nu_5, \nu_6 < 56$
$28 < \nu_3, \nu_4 < 40$.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGS. 7a, 7b and 7c are graphical plots of respectively spherical aberration and sine condition, astigmatism and distortion of the fifth embodiment of Table 5;

FIGS. 8a, 8b and 8c are graphical plots of respectively spherical aberration and sine condition, astigmatism and distortion of the sixth embodiment of Table 6; and FIGS. 9a, 9b and 9c are graphical plots of respectively spherical aberration and sine condition, astigmatism and distortion of the seventh embodiment of Table 7.

DETAILED DESCRIPTION OF THE PREFERRED EMBODIMENTS

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a compact five group, six lens element modified Gauss type lens system that can be readily manufactured.

The derivation of the specific lens assemblies parameters can be accomplished with the assistance of a computer. The present invention represents the parameters of a compromise balance of acceptable aberrations in a relatively easily manufactured modified Gauss type lens system that is suitable for use with a single lens reflex camera. The standards of acceptable aberrations are well-known in the optical field. The data presented herein in the Tables to be discussed subsequently, are more than adequate to permit a competent artisan in the optical art to reproduce embodiments of the present invention.

In the accompanying drawings, which supplement the following Tables, the lens system in accordance with the present invention, is illustrated schematically. As usual, in conventional lens diagrams, light is assumed to travel from left to right, and the individual lenses are designated by the letter, L, with a subscript indicating the position of the lenses as numbered consecutively from the object to image side. The radii of curvature of the lenses are indicated by the letter, r, with a subscript corresponding to the consecutive surfaces of the lens elements from left to right.

In the Tables, the minus signs indicate surfaces concave toward the object side, while the surfaces without a sign are convex toward the object side. The Tables also disclose the axial distance by the letter, d. The value of the axial distances between the lens elements are appropriately offset in the Tables to indicate their relative positions. All linear dimensions are given in absolute values with reference to an equivalent focal length $f=1.0$. The Tables also provide, with respect to each example, the field angle $2\omega$, the focal length f, the F number, the refractive index n, and the Abbe number $\nu$.

Figure 1:
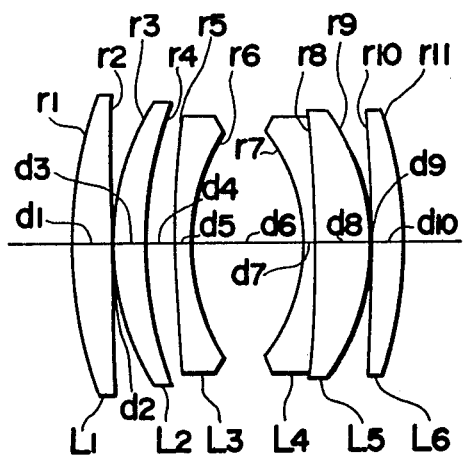
FIG. 1 is a schematic cross-sectional view showing the general lens arrangement of the present invention.
Figure 2A:
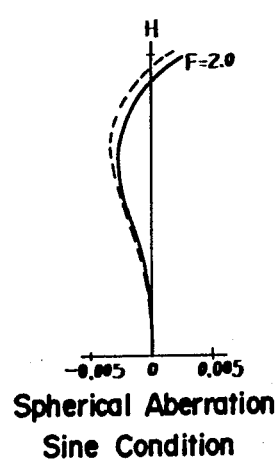
FIGS. 2a, 2b and 2c are graphical plots of respectively spherical aberration and sine condition, astigmatism and distortion of the first embodiment of Table 1.
Figure 2B:
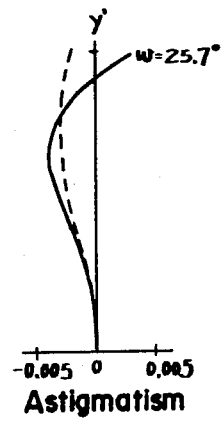
Figure 2C:
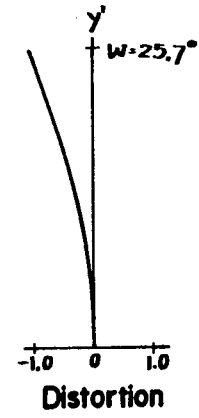

Since only the dimensions vary in each of the embodiments described herein, FIG. 1 is deemed adequate for a representation of each of the modified Gauss type lens systems of the present invention.

Referring to FIG. 1, the modified Gauss type lens system of 5-group, 6-element according to the present invention comprises from the object to the image side: a first group consisting of a first positive lens element $L_1$, the absolute value of the radius of curvature of the object side surface $r_1$ of the first element $L_1$ being less than that of the image side surface $r_2$; a second group consisting of a second positive meniscus lens element $L_2$ convex to the object side; a third group consisting of a third negative meniscus lens element $L_3$ convex to the object side; a fourth group consisting of a meniscus-shaped negative doublet convex to the image side and constructed by a fourth negative lens element $L_4$ and a fifth positive lens element $L_5$ cemented thereto; and a fifth group consisting of a sixth positive lens element $L_6$, the absolute value of the radius of curvature of the object side surface $r_{10}$ of the sixth element $L_6$ being greater than that of the image side surface $r_{11}$.

The lens system further fulfills the following conditions:

(1) $2.8f < f_{1,2,3} < 10f$
(2) $0.25 < (d_1+d_2+d_3+d_4+d_5)/\Sigma d < 0.35$
(3) $(N_1+N_2+N_5+N_6)/4 > 1.72$
(4) $1.0 < r_6/|r_7| < 1.5$
(5) $0.2f < |r_7| < 0.35f$
(6) $N_1, N_2 < 1.71$
(7) $30 < \nu_1, \nu_2, \nu_5, \nu_6 < 56$
(8) $28 < \nu_3, \nu_4 < 40$, wherein:

f represents the focal length of the whole lens system;

$f_{1,2,3}$ represents the combined focal length of the first, second and third groups;

$d_1$, $d_2$, $d_3$, $d_4$ and $d_5$ represent the first to fifth axial distances, respectively;

$\Sigma d$ represents the total axial distance;

$N_1$, $N_2$, $N_5$ and $N_6$ represent refractive indexes of glass materials for the first, second, fifth and sixth lens elements, respectively;

$r_6$ and $r_7$ represent the radii of curvature of the sixth and seventh refractive surfaces, respectively; and $\nu_1$, $\nu_2$, $\nu_3$, $\nu_4$, $\nu_5$ and $\nu_6$ represent Abbe numbers of glass materials for the first to sixth lens elements, respectively.

With respect to the above conditions, condition (1) is for clearly distinguishing the lens system of the present invention from a conventional 5-group, 6-element modified Gauss type lens system which can only have a back focal distance less than 75 percent of the focal length of the system. Namely, $f_{1,2,3}$ of the present invention is defined to be greater than that of the conventional modified Gauss type lens system for securing the sufficiently great back focal distance to be desired. If $f_{1,2,3}$ is reduced beyond the lower limit, it is difficult to obtain a back focal distance greater than 75 percent of the focal length of the system with the spherical aberration, astigmatism and field curvature sufficiently corrected. On the other hand, $f_{1,2,3}$ excessively increased beyond the upper limit may be favorable for merely increasing the back focal distance. In this case, however, the combination consisting of lens elements $L_4$, $L_5$ and $L_6$ is under an additional burden of compensating for an insufficiency of refractive power of the system caused by the increase of $f_{1,2,3}$. Further, it should be noted that the above mentioned burden is entirely on the positive elements $L_5$ and $L_6$ since $L_5$ is a negative element, which creates a difficulty in decreasing the Petzval Sum to balance aberration correction.

Condition (2) cooperates with condition (1) for obtaining a back focal distance greater than 75 percent of the focal length of the system by means of requiring a ratio of the axial distance defined between $r_1$ and $r_6$ to the total axial distance defined between $r_1$ and $r_{11}$ to be small in comparison to a conventional modified Gauss type lens system. In case of the ratio in condition (2) increased beyond the upper limit, the incident height from the optical axis of a light ray at surface $r_6$ is too low. It would be necessary in the above case to excessively decrease the absolute value for the radius of curvature of surface $r_7$ so as to obtain the sufficient back focal distance desired. Further, positive elements $L_5$ and $L_6$ have to be of a greater positive refractive power to compensate for the decrease of the total positive refractive power of a combination consisting of elements $L_4$, $L_5$ and $L_6$ caused by the increased negative refractive power of $L_4$ due to the decreased absolute value for the radius of curvature of surface $r_7$. Thus, a loss of balance of power distribution in the system results to make the aberration correction difficult. In case the ratio in condition (2) decreases beyond the lower limit, on the other hand, the incident height from the optical axis of a light ray at surface $r_6$ is so high that the spherical aberration is too greatly generated at elements $L_4$, $L_5$ and $L_6$ to possibly be corrected.

Condition (3) is added to conditions (1) and (2) for successfully reducing spherical aberration, decreasing Petzval Sum $\Sigma P$ to improve field curvature and minimizing coma flare. In case condition (3) is violated, sum of axial distance $\Sigma d$ is inevitably increased for decreasing the Petzval Sum $\Sigma P$. Thus, it will be difficult to obtain a back focal distance greater than 75 percent of the focal length of the system. Even in a case that sufficient back focal distance itself is possible, the diameter of the lens system has to be inevitably increased to secure a desirable marginal illumination, which fails in providing the compact lens system aimed by the present invention.

Condition (4) requires $r_6/|r_7|$ to be greater than 1 for securing a long back focal length and for making it possible to correct spherical aberration in contrast to the conventional case in which $r_6/|r_7|$ is less than 1 as utilized in most the conventional modified Gauss type lens systems of a back focal distance less than 75 percent of the focal length of the system. Above the upper limit of condition (4), it is necessary to make the refractive powers for elements $L_5$ and $L_6$ stronger. In this condition, however, it is difficult to decrease the Petzval Sum $\Sigma P$ without using glass materials of extremely high refractive index. But, available glass materials are not unlimited and the difficulty in correcting chromatic aberration has to be also taken into consideration upon selective of glass materials, which makes a system costly even if such a system is possible with chromatic and other various aberrations corrected.

Condition (5) is recommended to be added to condition (4) to further defining the radius of curvature of surface $r_7$ within a specific range for desirable aberration corrections. An excessive refractive power of surface $r_7$ will result in over correction of spherical aberration in case of $|r_7|$ below the lower limit of condition (5), while a desirable back focal distance will be difficult to be obtained in case that $|r_7|$ increases beyond the upper limit.

Condition (6) which cooperates with condition (3) is favorable for correcting spherical aberration and reducing the Petzval Sum.

With conditions (1) through (6) fulfilled, conditions (7) and (8) are recommendable to correct the chromatic aberration of the system.

The following Tables disclose seven embodiments of the present invention.

TABLE 1

(Embodiment 1)

$f = 1.0$ F/2.0 $2\omega = 51.4°$ Back Focal Distance S' = 0.8032

| Radius of Curvature | | Axial Distance | | Refractive Index | | Abbe Number |
|---|---|---|---|---|---|---|
| $r_1$ | 0.7949 | | | | | |
| | | $d_1$ | 0.065 | $N_1$ 1.781 | $\nu_1$ | 44.5 |
| $r_2$ | 7.9025 | | | | | |
| | | $d_2$ | 0.0023 | | | |
| $r_3$ | 0.4176 | | | | | |
| | | $d_3$ | 0.056 | $N_2$ 1.7495 | $\nu_2$ | 50.1 |
| $r_4$ | 0.6409 | | | | | |
| | | $d_4$ | 0.04366 | | | |
| $r_5$ | 1.7157 | | | | | |
| | | $d_5$ | 0.021 | $N_3$ 1.7006 | $\nu_3$ | 30.1 |
| $r_6$ | 0.3328 | | | | | |
| | | $d_6$ | 0.2067 | | | |
| $r_7$ | −0.2891 | | | | | |
| | | $d_7$ | 0.01885 | $N_4$ 1.5927 | $\nu_4$ | 35.3 |
| $r_8$ | −2.2539 | | | | | |
| | | $d_8$ | 0.08497 | $N_5$ 1.7495 | $\nu_5$ | 50.1 |
| $r_9$ | −0.4131 | | | | | |
| | | $d_9$ | 0.0023 | | | |
| $r_{10}$ | −9.8084 | | | | | |
| | | $d_{10}$ | 0.063 | $N_6$ 1.6968 | $\nu_6$ | 55.5 |
| $r_{11}$ | −0.6374 | | | | | |
| | | $\Sigma d$ | 0.56378 | | | |

TABLE 2

(Embodiment 2)

$f = 1.0$ F/2.0 $2\omega = 51.4°$ Back Focal Distance S' = 0.8020

| Radius of Curvature | | Axial Distance | | Refractive Index | | Abbe Number |
|---|---|---|---|---|---|---|
| $r_1$ | 0.8194 | | | | | |
| | | $d_1$ | 0.062 | $N_1$ 1.7495 | $\nu_1$ | 50.1 |
| $r_2$ | 11.497 | | | | | |
| | | $d_2$ | 0.0022 | | | |
| $r_3$ | 0.4270 | | | | | |
| | | $d_3$ | 0.05395 | $N_2$ 1.7495 | $\nu_2$ | 50.1 |
| $r_4$ | 0.6683 | | | | | |
| | | $d_4$ | 0.04959 | | | |
| $r_5$ | 1.8047 | | | | | |
| | | $d_5$ | 0.0206 | $N_3$ 1.683 | $\nu_3$ | 31.5 |
| $r_6$ | 0.3420 | | | | | |
| | | $d_6$ | 0.19889 | | | |
| $r_7$ | −0.2893 | | | | | |
| | | $d_7$ | 0.0185 | $N_4$ 1.5927 | $\nu_4$ | 35.3 |
| $r_8$ | −2.0776 | | | | | |
| | | $d_8$ | 0.08909 | $N_5$ 1.7495 | $\nu_5$ | 50.1 |
| $r_9$ | −0.4045 | | | | | |
| | | $d_9$ | 0.0023 | | | |
| $r_{10}$ | −14.3765 | | | | | |
| | | $d_{10}$ | 0.0595 | $N_6$ 1.6968 | $\nu_6$ | 55.5 |
| $r_{11}$ | −0.6925 | | | | | |
| | | $\Sigma d$ | 0.55662 | | | |

TABLE 3

(Embodiment 3)

$f = 1.0$ F/2.0 $2\omega = 56.8°$ Back Focal Distance S' = 0.9008

| Radius of Curvature | | Axial Distance | | Refractive Index | | Abbe Number |
|---|---|---|---|---|---|---|
| $r_1$ | 0.9285 | | | | | |
| | | $d_1$ | 0.06621 | $N_1$ 1.80741 | $\nu_1$ | 31.6 |
| $r_2$ | 6.6429 | | | | | |
| | | $d_2$ | 0.0025 | | | |
| $r_3$ | 0.4240 | | | | | |
| | | $d_3$ | 0.05506 | $N_2$ 1.72 | $\nu_2$ | 52.1 |
| $r_4$ | 0.7729 | | | | | |
| | | $d_4$ | 0.02925 | | | |
| $r_5$ | 1.6497 | | | | | |
| | | $d_5$ | 0.0204 | $N_3$ 1.71736 | $\nu_3$ | 29.4 |
| $r_6$ | 0.3272 | | | | | |
| | | $d_6$ | 0.23616 | | | |
| $r_7$ | −0.2499 | | | | | |
| | | $d_7$ | 0.01867 | $N_4$ 1.5927 | $\nu_4$ | 35.3 |
| $r_8$ | −1.6006 | | | | | |
| | | $d_8$ | 0.08584 | $N_5$ 1.6968 | $\nu_5$ | 55.5 |
| $r_9$ | −0.3352 | | | | | |
| | | $d_9$ | 0.0025 | | | |
| $r_{10}$ | −9.0315 | | | | | |
| | | $d_{10}$ | 0.06814 | $N_6$ 1.6968 | $\nu_6$ | 55.5 |
| $r_{11}$ | −0.6329 | | | | | |
| | | $\Sigma d$ | 0.58478 | | | |

TABLE 4

(Embodiment 4)

$f = 1.0$ F/2.0 $2\omega = 51.4°$ Back Focal Distance S' = 0.8016

| Radius of Curvature | | Axial Distance | | Refractive Index | | Abbe Number |
|---|---|---|---|---|---|---|
| $r_1$ | 0.7516 | | | | | |
| | | $d_1$ | 0.06048 | $N_1$ 1.744 | $\nu_1$ | 45.0 |
| $r_2$ | 8.2029 | | | | | |
| | | $d_2$ | 0.0025 | | | |
| $r_3$ | 0.4323 | | | | | |
| | | $d_3$ | 0.07349 | $N_2$ 1.7495 | $\nu_2$ | 50.1 |
| $r_4$ | 0.6455 | | | | | |
| | | $d_4$ | 0.0344 | | | |
| $r_5$ | 1.6810 | | | | | |
| | | $d_5$ | 0.0213 | $N_3$ 1.7174 | $\nu_3$ | 29.4 |
| $r_6$ | 0.3353 | | | | | |
| | | $d_6$ | 0.20464 | | | |
| $r_7$ | −0.2784 | | | | | |
| | | $d_7$ | 0.0185 | $N_4$ 1.6057 | $\nu_4$ | 37.8 |
| $r_8$ | −1.5827 | | | | | |
| | | $d_8$ | 0.08454 | $N_5$ 1.6968 | $\nu_5$ | 55.5 |
| $r_9$ | −0.3784 | | | | | |
| | | $d_9$ | 0.0025 | | | |
| $r_{10}$ | 59.047 | | | | | |
| | | $d_{10}$ | 0.06654 | $N_6$ 1.6968 | $\nu_6$ | 55.5 |
| $r_{11}$ | −0.6465 | | | | | |
| | | $\Sigma d$ | 0.5689 | | | |

TABLE 5

(Embodiment 5)

$f = 1.0$ F/1.8 $2\omega = 51.4°$ Back Focal Distance S' = 0.7985

| Radius of Curvature | | Axial Distance | | Refractive Index | | Abbe Number |
|---|---|---|---|---|---|---|
| $r_1$ | 0.8710 | | | | | |
| | | $d_1$ | 0.05991 | $N_1$ 1.7885 | $\nu_1$ | 45.7 |
| $r_2$ | 11.832 | | | | | |
| | | $d_2$ | 0.0025 | | | |
| $r_3$ | 0.4437 | | | | | |
| | | $d_3$ | 0.07383 | $N_2$ 1.7885 | $\nu_2$ | 45.7 |
| $r_4$ | 0.6691 | | | | | |
| | | $d_4$ | 0.0346 | | | |
| $r_5$ | 2.0179 | | | | | |
| | | $d_5$ | 0.0213 | $N_3$ 1.7174 | $\nu_3$ | 29.4 |
| $r_6$ | 0.3558 | | | | | |
| | | $d_6$ | 0.21689 | | | |
| $r_7$ | −0.2915 | | | | | |

TABLE 5-continued (Embodiment 5)

f = 1.0 F/1.8 2ω = 51.4° Back Focal Distance S' = 0.7985

| Radius of Curvature | | Axial Distance | | Refractive Index | | Abbe Number |
|---|---|---|---|---|---|---|
| | $d_7$ | 0.0185 | $N_4$ | 1.5927 | $\nu_4$ | 35.3 |
| $r_8$ −2.7943 | | | | | | |
| | $d_8$ | 0.08771 | $N_5$ | 1.7495 | $\nu_5$ | 50.1 |
| $r_9$ −0.3913 | | | | | | |
| | $d_9$ | 0.0025 | | | | |
| $r_{10}$ 18.863 | | | | | | |
| | $d_{10}$ | 0.06589 | $N_6$ | 1.72 | $\nu_6$ | 54.7 |
| $r_{11}$ −0.8231 | | | | | | |
| | Σd | 0.58363 | | | | |

TABLE 6

(Embodiment 6)

f = 1.0 F/1.8 2ω = 51.4° Back Focal Distance S' = 0.7986

| Radius of Curvature | | Axial Distance | | Refractive Index | | Abbe Number |
|---|---|---|---|---|---|---|
| $r_1$ 0.8064 | | | | | | |
| | $d_1$ | 0.065 | $N_1$ | 1.757 | $\nu_1$ | 47.7 |
| $r_2$ 14.576 | | | | | | |
| | $d_2$ | 0.0025 | | | | |
| $r_3$ 0.4500 | | | | | | |
| | $d_3$ | 0.07564 | $N_2$ | 1.7885 | $\nu_2$ | 45.7 |
| $r_4$ 0.6442 | | | | | | |
| | $d_4$ | 0.03466 | | | | |
| $r_5$ 2.2136 | | | | | | |
| | $d_5$ | 0.021 | $N_3$ | 1.7006 | $\nu_3$ | 30.1 |
| $r_6$ 0.3563 | | | | | | |
| | $d_6$ | 0.21591 | | | | |
| $r_7$ −0.3018 | | | | | | |
| | $d_7$ | 0.0189 | $N_4$ | 1.5927 | $\nu_4$ | 35.3 |
| $r_8$ −1.322 | | | | | | |
| | $d_8$ | 0.09749 | $N_5$ | 1.6968 | $\nu_5$ | 55.5 |
| $r_9$ −0.4032 | | | | | | |
| | $d_9$ | 0.0025 | | | | |
| $r_{10}$ 5.2744 | | | | | | |
| | $d_{10}$ | 0.0614 | $N_6$ | 1.6968 | $\nu_6$ | 55.5 |
| $r_{11}$ −0.7687 | | | | | | |
| | Σd | 0.59500 | | | | |

TABLE 7

(Embodiment 7)

f = 1.0 F/2.0 2ω = 51.4° Back Focal Distance S' = 0.8014

| Radius of Curvature | | Axial Distance | | Refractive Index | | Abbe Number |
|---|---|---|---|---|---|---|
| $r_1$ 0.8330 | | | | | | |
| | $d_1$ | 0.065 | $N_1$ | 1.781 | $\nu_1$ | 44.5 |
| $r_2$ 7.3944 | | | | | | |
| | $d_2$ | 0.0025 | | | | |
| $r_3$ 0.4323 | | | | | | |
| | $d_3$ | 0.0745 | $N_2$ | 1.7495 | $\nu_2$ | 50.1 |
| $r_4$ 0.6501 | | | | | | |
| | $d_4$ | 0.03 | | | | |
| $r_5$ 1.5467 | | | | | | |
| | $d_5$ | 0.026 | $N_3$ | 1.7006 | $\nu_3$ | 30.1 |
| $r_6$ 0.3432 | | | | | | |
| | $d_6$ | 0.2032 | | | | |
| $r_7$ −0.2891 | | | | | | |
| | $d_7$ | 0.026 | $N_4$ | 1.6398 | $\nu_4$ | 35.3 |
| $r_8$ −1.6219 | | | | | | |
| | $d_8$ | 0.085 | $N_5$ | 1.7545 | $\nu_5$ | 50.1 |
| $r_9$ −0.3926 | | | | | | |
| | $d_9$ | 0.0025 | | | | |
| $r_{10}$ 13.83 | | | | | | |
| | $d_{10}$ | 0.066 | $N_6$ | 1.6968 | $\nu_6$ | 55.5 |
| $r_{11}$ −0.7280 | | | | | | |
| | Σd | 0.5807 | | | | |

Figure 3A:
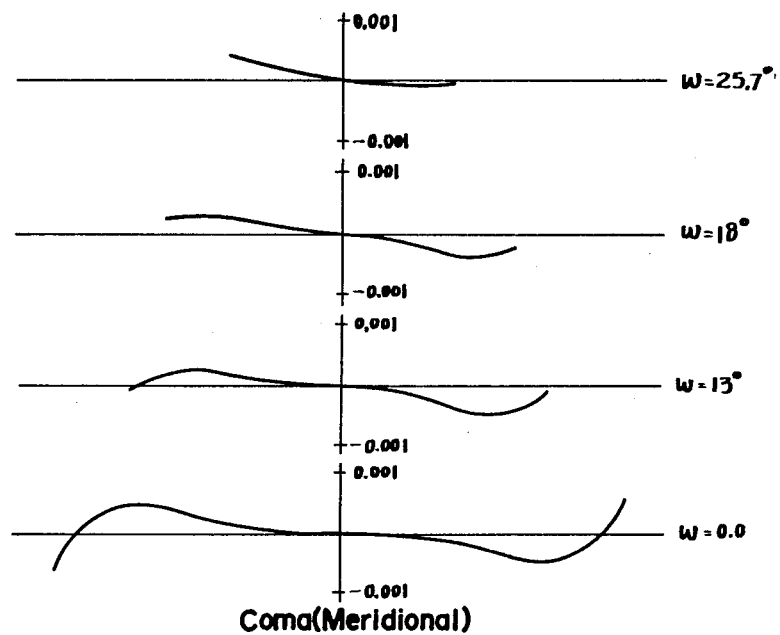
FIGS. 3a and 3b are graphical plots of respectively meridional coma and sagital coma of the first embodiment of Table 1.
Figure 3B:
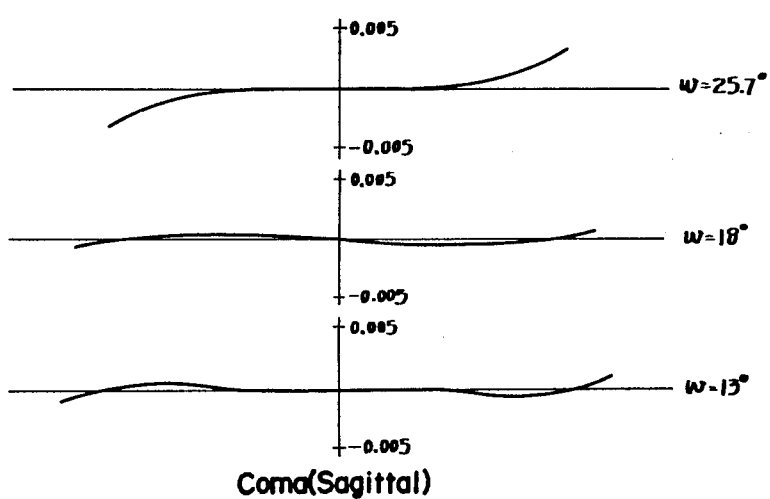
Figure 4A:
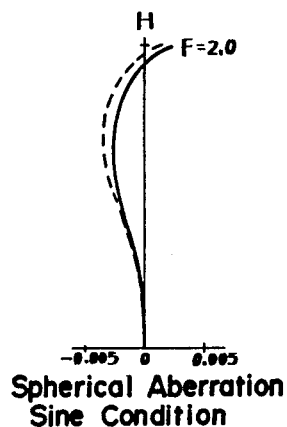
FIGS. 4a, 4b and 4c are graphical plots of respectively spherical aberration and sine condition, astigmatism and distortion of the second embodiment of Table 2.
Figure 4B:
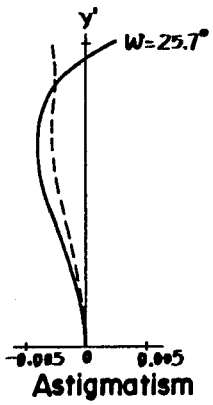
Figure 4C:
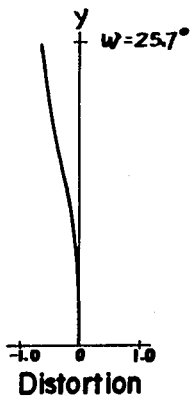
Figure 5A:
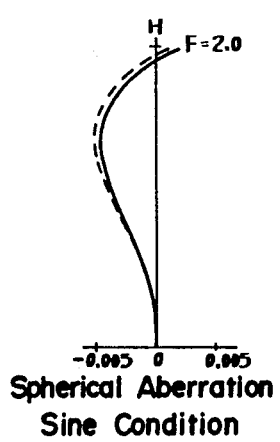
FIGS. 5a, 5b and 5c are graphical plots of respectively spherical aberration and sine condition, astigmatism and distortion of the third embodiment of Table 3.
Figure 5B:
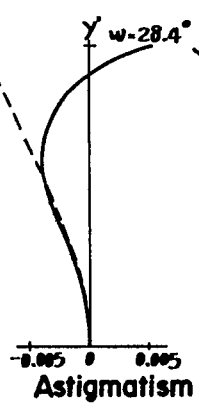
Figure 5C:
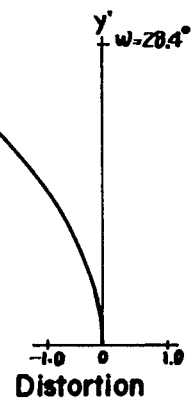
Figure 6A:
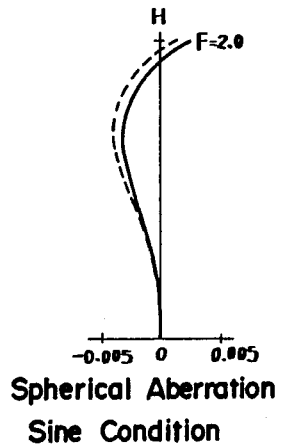
FIGS. 6a, 6b and 6c are graphical plots of respectively spherical aberration and sine condition, astigmatism and distortion of the fourth embodiment of Table 4.
Figure 6B:
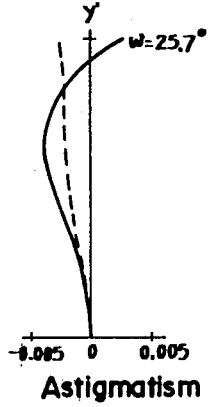
Figure 6C:
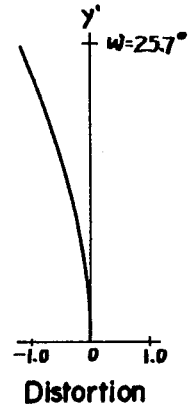

FIGS. 2 and 4 to 9 correspond to the first to the seventh embodiments. Coma is shown in FIG. 3 with respect to only the first embodiment since the other embodiments show similar coma.

Since an optical designer given the design parameters of the present invention, can comprehend both the significance and the possibility of creating modifications within the parameters of the present invention, it should be understood that the above examples are merely illustrative and accordingly the present invention should be measured solely from the following claims, in which I claim:

1. A modified Gauss type lens system of 5 groups and 6 lens elements comprising from the object to the image side:
   a first group consisting of a first positive lens element, the absolute value of the radius of curvature of the object side surface of the first element being less than that of the image side surface;
   a second group consisting of a second positive meniscus lens element convex to the object side;
   a third group consisting of a third negative meniscus lens element convex to the object side;
   a fourth group consisting of a meniscus-shaped negative doublet convex to the image side and constructed by a fourth negative lens element and a fifth positive lens element cemented thereto; and
   a fifth group consisting of a sixth positive lens element, the absolute value of the radius of curvature of the object side surface of the sixth element being greater than that of the image side surface,
   the lens system being further characterized by its relatively long back focal distance which is defined to be greater than 75 percent of the focal length of the whole lens system and the lens system further fulfills the following conditions:
   $29 < \nu_3, \nu_4 < 40$
   $1.72 < (N_1 + N_2 + N_5 + N_6)/4 < 1.77$
   wherein $\nu_3$ and $\nu_4$ represent the Abbe numbers of the glass materials for the third and fourth lens elements, and $N_1$, $N_2$, $N_5$ and $N_6$ represent refractive indexes of glass materials for the first, second, fifth and sixth lens elements, respectively.

2. The invention of claim 1, wherein the lens system fulfills the following condition:
   $1.1 < r_6/|r_7| < 1.5$,
   wherein $r_6$ and $r_7$ represent the radii of curvature of the sixth and seventh refractive surfaces, respectively.

3. The invention of claim 1, wherein the lens system fulfills the following conditions:
   $2.8f < f_{1,2,3} < 10f$
   $0.25 < (d_1 + d_2 + d_3 + d_4 + d_5)/\Sigma d < 0.35$
   wherein:
   f represents the focal length of the whole lens system;
   $f_{1,2,3}$ represents the over-all focal length of the first to third groups;
   $d_1$, $d_2$, $d_3$, $d_4$ and $d_5$ represent the first to fifth axial distances, respectively; and
   Σd represents the total axial distance.

4. The invention of claim 1, wherein the lens system further fulfills the following condition:
   $1.0 < r_6/|r_7| < 1.5$
   wherein $r_6$ and $r_7$ represent the radii of curvature of the sixth and seventh refractive surfaces, respectively.

5. The invention of claim 4, wherein the range of $r_6/|r_7|$ is as follows:
   $1.15 < r_6/|r_7| < 1.23$.

6. The invention of claim 4, wherein the lens system further fulfills the following condition:
   $0.2f < |r_7| < 0.35f$.

7. The invention of claim 6, wherein the lens system further fulfills the following conditions:

$N_1, N_2 > 1.71$
$30 < \nu_1, \nu_2, \nu_5, \nu_6 < 56$
$28 < \nu_3, \nu_4 < 40$ wherein $\nu_1, \nu_2, \nu_3, \nu_4, \nu_5$ and $\nu_6$ represent Abbe numbers of glass materials for the first to sixth lens elements, respectively.

8. The invention of claim 1, wherein the lens system fulfills the following condition:

$3.5f < f_{1,2,3} < 8f$ wherein:
f represents the focal length of the whole lens system; and
$f_{1,2,3}$ represents the over-all focal length of first to third groups.

9. The invention of claim 1 which further fulfills the following condition:

$2.8f < f_{1,2,3} < 4.04f$ wherein f represents the focal length of the whole lens system and $f_{1,2,3}$ represents the overall focal length of the first to third groups.

10. The invention of claim 1 which further fulfills the following condition:

$1.15 < r_6/|r_7| < 1.23$ wherein $r_6$ and $r_7$ represent the radii of curvature of the sixth and seventh refractive surfaces, respectively.

11. The invention of claim 10 which further fulfills the following condition:

$1.71 < N_1, N_2 < 1.8$.

12. The invention of claim 11 which further fulfills the following condition:

$0.75f < $ Back Focal Distance $ < 0.83f$.

13. A modified Gauss type lens system of 5 groups and 6 lens elements comprising from the object to the image side:
a first group consisting of a first positive lens element, the absolute value of the radius of curvature of the object side surface of the first element being less than that of the image side surface;
a second group consisting of a second positive meniscus lens element convex to the object side;
a third group consisting of a third negative meniscus lens element convex to the object side;
a fourth group consisting of a meniscus-shaped negative doublet convex to the image side and constructed by a fourth negative lens element and a fifth positive lens element cemented thereto; and
a fifth group consisting of a sixth positive lens element, the absolute value of the radius of curvature of the object side surface of the sixth element being greater than that of the image side surface,
the lens system being further characterized by its relatively long back focal distance which is defined to be between 76 to 83 percent of the focal length of the whole lens system, the lens system further fulfilling the following conditions:

$2.8f < f_{1,2,3} < 10f$
$0.25 < (d_1+d_2+d_3+d_4+d_5)/\Sigma d < 0.35$
$1.72 < (N_1+N_2+N_5+N_6)/4 < 1.77$ wherein:
f represents the focal length of the whole lens system;
$f_{1,2,3}$ represents the overall focal length of the first to third groups;
$d_1, d_2, d_3, d_4,$ and $d_5$ represent the first to fifth axial distances, respectively;
$\Sigma d$ represents the total axial distance, and
$N_1, N_2, N_5$ and $N_6$ represent refractive indexes of glass materials for the first, second, fifth and sixth lens elements, respectively.

14. The invention of claim 13 which further includes the following condition:

$1.71 < N_1, N_2 < 1.8$.

15. A modified Gauss type lens system of 5-group, 6-element construction comprising the following design parameters;

f = 1.0 F/2.0 2ω = 51.4° Back Focal Distance S' = 0.8032

| | Radius of Curvature | | Axial Distance | | Refractive Index | | Abbe Number |
|---|---|---|---|---|---|---|---|
| $r_1$ | 0.7949 | | | | | | |
| | | $d_1$ | 0.065 | $N_1$ | 1.781 | $\nu_1$ | 44.5 |
| $r_2$ | 7.9025 | | | | | | |
| | | $d_2$ | 0.0023 | | | | |
| $r_3$ | 0.4176 | | | | | | |
| | | $d_3$ | 0.056 | $N_2$ | 1.7495 | $\nu_2$ | 50.1 |
| $r_4$ | 0.6409 | | | | | | |
| | | $d_4$ | 0.04366 | | | | |
| $r_5$ | 1.7157 | | | | | | |
| | | $d_5$ | 0.021 | $N_3$ | 1.7006 | $\nu_3$ | 30.1 |
| $r_6$ | 0.3328 | | | | | | |
| | | $d_6$ | 0.2067 | | | | |
| $r_7$ | −0.2891 | | | | | | |
| | | $d_7$ | 0.01885 | $N_4$ | 1.5927 | $\nu_4$ | 35.3 |
| $r_8$ | −2.2539 | | | | | | |
| | | $d_8$ | 0.08497 | $N_5$ | 1.7495 | $\nu_5$ | 50.1 |
| $r_9$ | −0.4131 | | | | | | |
| | | $d_9$ | 0.0023 | | | | |
| $r_{10}$ | −9.8084 | | | | | | |
| | | $d_{10}$ | 0.063 | $N_6$ | 1.6968 | $\nu_6$ | 55.5 |
| $r_{11}$ | −0.6374 | | | | | | |
| | | $\Sigma d$ | 0.56378 | | | | |

16. A modified Gauss type lens system of 5 groups and 6 lens elements comprising the following design parameters;

f = 1.0 F/2.0 2ω = 51.4° Back Focal Distance S' = 0.8020

| | Radius of Curvature | | Axial Distance | | Refractive Index | | Abbe Number |
|---|---|---|---|---|---|---|---|
| $r_1$ | 0.8194 | | | | | | |
| | | $d_1$ | 0.062 | $N_1$ | 1.7495 | $\nu_1$ | 50.1 |
| $r_2$ | 11.497 | | | | | | |
| | | $d_2$ | 0.0022 | | | | |
| $r_3$ | 0.4270 | | | | | | |
| | | $d_3$ | 0.05395 | $N_2$ | 1.7495 | $\nu_2$ | 50.1 |
| $r_4$ | 0.6683 | | | | | | |
| | | $d_4$ | 0.04959 | | | | |
| $r_5$ | 1.8047 | | | | | | |
| | | $d_5$ | 0.0206 | $N_3$ | 1.683 | $\nu_3$ | 31.5 |
| $r_6$ | 0.3420 | | | | | | |
| | | $d_6$ | 0.19889 | | | | |
| $r_7$ | −0.2893 | | | | | | |
| | | $d_7$ | 0.0185 | $N_4$ | 1.5927 | $\nu_4$ | 35.3 |
| $r_8$ | −2.0776 | | | | | | |
| | | $d_8$ | 0.08909 | $N_5$ | 1.7495 | $\nu_5$ | 50.1 |
| $r_9$ | −0.4045 | | | | | | |
| | | $d_9$ | 0.0023 | | | | |
| $r_{10}$ | −14.3765 | | | | | | |
| | | $d_{10}$ | 0.0595 | $N_6$ | 1.6968 | $\nu_6$ | 55.5 |
| $r_{11}$ | −0.6925 | | | | | | |
| | | $\Sigma d$ | 0.55662 | | | | |

17. A modified Gauss type lens system of 5 groups and 6 lens elements comprising the following design parameters;

| \multicolumn{5}{c|}{f = 1.0 F/2.0 2ω = 56.8° Back Focal Distance S' = 0.9008} |
| Radius of Curvature | Axial Distance | | Refractive Index | | Abbe Number |
| --- | --- | --- | --- | --- | --- |
| $r_1$ 0.9285 | | | | | |
| | $d_1$ | 0.06621 | $N_1$ 1.80741 | $\nu_1$ | 31.6 |
| $r_2$ 6.6429 | | | | | |
| | $d_2$ | 0.0025 | | | |
| $r_3$ 0.4240 | | | | | |
| | $d_3$ | 0.05506 | $N_2$ 1.72 | $\nu_2$ | 52.1 |
| $r_4$ 0.7729 | | | | | |
| | $d_4$ | 0.02925 | | | |
| $r_5$ 1.6497 | | | | | |
| | $d_5$ | 0.0204 | $N_3$ 1.71736 | $\nu_3$ | 29.4 |
| $r_6$ 0.3272 | | | | | |
| | $d_6$ | 0.23616 | | | |
| $r_7$ −0.2499 | | | | | |
| | $d_7$ | 0.01867 | $N_4$ 1.5927 | $\nu_4$ | 35.3 |
| $r_8$ −1.6006 | | | | | |
| | $d_8$ | 0.08584 | $N_5$ 1.6968 | $\nu_5$ | 55.5 |
| $r_9$ −0.3352 | | | | | |
| | $d_9$ | 0.0025 | | | |
| $r_{10}$ −9.0315 | | | | | |
| | $d_{10}$ | 0.06814 | $N_6$ 1.6968 | $\nu_6$ | 55.5 |
| $r_{11}$ −0.6329 | | | | | |
| | Σd | 0.58478 | | | |

18. A modified Gauss type lens system of 5 groups and 6 lens elements comprising the following design parameters;

| \multicolumn{5}{c|}{f = 1.0 F/2.0 2ω = 51.4° Back Focal Distance S' = 0.8016} |
| Radius of Curvature | Axial Distance | | Refractive Index | | Abbe Number |
| --- | --- | --- | --- | --- | --- |
| $r_1$ 0.7516 | | | | | |
| | $d_1$ | 0.06048 | $N_1$ 1.744 | $\nu_1$ | 45.0 |
| $r_2$ 8.2029 | | | | | |
| | $d_2$ | 0.0025 | | | |
| $r_3$ 0.4323 | | | | | |
| | $d_3$ | 0.07349 | $N_2$ 1.7495 | $\nu_2$ | 50.1 |
| $r_4$ 0.6455 | | | | | |
| | $d_4$ | 0.0344 | | | |
| $r_5$ 1.6810 | | | | | |
| | $d_5$ | 0.0213 | $N_3$ 1.7174 | $\nu_3$ | 29.4 |
| $r_6$ 0.3353 | | | | | |
| | $d_6$ | 0.20464 | | | |
| $r_7$ −0.2784 | | | | | |
| | $d_7$ | 0.0185 | $N_4$ 1.6057 | $\nu_4$ | 37.8 |
| $r_8$ −1.5827 | | | | | |
| | $d_8$ | 0.08454 | $N_5$ 1.6968 | $\nu_5$ | 55.5 |
| $r_9$ −0.3784 | | | | | |
| | $d_9$ | 0.0025 | | | |
| $r_{10}$ 59.047 | | | | | |
| | $d_{10}$ | 0.06654 | $N_6$ 1.6968 | $\nu_6$ | 55.5 |
| $r_{11}$ −0.6465 | | | | | |
| | Σd | 0.5689 | | | |

19. A modified Gauss type lens system of 5 groups and 6 lens elements comprising the following design parameters;

| \multicolumn{5}{c|}{f = 1.0 F/1.8 2ω = 51.4° Back Focal Distance S' = 0.7985} |
| Radius of Curvature | Axial Distance | | Refractive Index | | Abbe Number |
| --- | --- | --- | --- | --- | --- |
| $r_1$ 0.8710 | | | | | |
| | $d_1$ | 0.05991 | $N_1$ 1.7885 | $\nu_1$ | 45.7 |
| $r_2$ 11.832 | | | | | |
| | $d_2$ | 0.0025 | | | |
| $r_3$ 0.4437 | | | | | |
| | $d_3$ | 0.07383 | $N_2$ 1.7885 | $\nu_2$ | 45.7 |
| $r_4$ 0.6691 | | | | | |
| | $d_4$ | 0.0346 | | | |
| $r_5$ 2.0179 | | | | | |
| | $d_5$ | 0.0213 | $N_3$ 1.7174 | $\nu_3$ | 29.4 |
| $r_6$ 0.3558 | | | | | |
| | $d_6$ | 0.21689 | | | |
| $r_7$ −0.2915 | | | | | |
| | $d_7$ | 0.0185 | $N_4$ 1.5927 | $\nu_4$ | 35.3 |
| $r_8$ −2.7943 | | | | | |
| | $d_8$ | 0.08771 | $N_5$ 1.7495 | $\nu_5$ | 50.1 |
| $r_9$ −0.3913 | | | | | |
| | $d_9$ | 0.0025 | | | |
| $r_{10}$ 18.863 | | | | | |
| | $d_{10}$ | 0.06589 | $N_6$ 1.72 | $\nu_6$ | 54.7 |
| $r_{11}$ −0.8231 | | | | | |
| | Σd | 0.58363 | | | |

20. A modified Gauss type lens system of 5 groups and 6 lens elements comprising the following design parameters;

| \multicolumn{5}{c|}{f = 1.0 F/1.8 2ω = 51.4° Back Focal Distance S' = 0.7986} |
| Radius of Curvature | Axial Distance | | Refractive Index | | Abbe Number |
| --- | --- | --- | --- | --- | --- |
| $r_1$ 0.8064 | | | | | |
| | $d_1$ | 0.065 | $N_1$ 1.757 | $\nu_1$ | 47.7 |
| $r_2$ 14.576 | | | | | |
| | $d_2$ | 0.0025 | | | |
| $r_3$ 0.4500 | | | | | |
| | $d_3$ | 0.07564 | $N_2$ 1.7885 | $\nu_2$ | 45.7 |
| $r_4$ 0.6442 | | | | | |
| | $d_4$ | 0.03466 | | | |
| $r_5$ 2.2136 | | | | | |
| | $d_5$ | 0.021 | $N_3$ 1.7006 | $\nu_3$ | 30.1 |
| $r_6$ 0.3563 | | | | | |
| | $d_6$ | 0.21591 | | | |
| $r_7$ −0.3018 | | | | | |
| | $d_7$ | 0.0189 | $N_4$ 1.5927 | $\nu_4$ | 35.3 |
| $r_8$ −1.322 | | | | | |
| | $d_8$ | 0.09749 | $N_5$ 1.6968 | $\nu_5$ | 55.5 |
| $r_9$ −0.4032 | | | | | |
| | $d_9$ | 0.0025 | | | |
| $r_{10}$ 5.2744 | | | | | |
| | $d_{10}$ | 0.0614 | $N_6$ 1.6968 | $\nu_6$ | 55.5 |
| $r_{11}$ −0.7687 | | | | | |
| | Σd | 0.59500 | | | |

21. A modified Gauss type lens system of 5 groups and 6 lens elements comprising the following design parameters;

| \multicolumn{5}{c|}{f = 1.0 F/2.0 2ω = 51.4° Back Focal Distance S' = 0.8014} |
| Radius of Curvature | Axial Distance | | Refractive Index | | Abbe Number |
| --- | --- | --- | --- | --- | --- |
| $r_1$ 0.8330 | | | | | |
| | $d_1$ | 0.065 | $N_1$ 1.781 | $\nu_1$ | 44.5 |
| $r_2$ 7.3944 | | | | | |
| | $d_2$ | 0.0025 | | | |
| $r_3$ 0.4323 | | | | | |
| | $d_3$ | 0.0745 | $N_2$ 1.7495 | $\nu_2$ | 50.1 |
| $r_4$ 0.6501 | | | | | |
| | $d_4$ | 0.03 | | | |
| $r_5$ 1.5467 | | | | | |
| | $d_5$ | 0.026 | $N_3$ 1.7006 | $\nu_3$ | 30.1 |
| $r_6$ 0.3432 | | | | | |
| | $d_6$ | 0.2032 | | | |
| $r_7$ −0.2891 | | | | | |
| | $d_7$ | 0.026 | $N_4$ 1.6398 | $\nu_4$ | 35.3 |
| $r_8$ −1.6219 | | | | | |
| | $d_8$ | 0.085 | $N_5$ 1.7545 | $\nu_5$ | 50.1 |
| $r_9$ −0.3926 | | | | | |
| | $d_9$ | 0.0025 | | | |
| $r_{10}$ 13.83 | | | | | |
| | $d_{10}$ | 0.066 | $N_6$ 1.6968 | $\nu_6$ | 55.5 |
| $r_{11}$ −0.7280 | | | | | |
| | Σd | 0.5807 | | | |

* * * * *